United States Patent Office 3,308,175
Patented Mar. 7, 1967

3,308,175
METHOD FOR PREPARATION OF FLUORINE SUBSITUTED DIENES
John T. Barr, Neshaminy, Pa., assignor to Pennsalt Chemicals Corporation, a corporation of Pennsylvania
No Drawing. Filed Apr. 7, 1954, Ser. No. 421,677
3 Claims. (Cl. 260—653.5)

This invention relates to novel fluorine-substituted dienes, to a method for the preparation thereof, to certain novel intermediates in the preparation thereof, and to certain novel intermediates for the production of homologous fluorine-substituted dienes.

Generally speaking, the method of preparing the ultimate compounds of this invention consists of three steps: (1) the coupling of a non-olefinic fluorine-containing halogenated compound with an olefin; (2) treatment of the product of step (1) for the removal of hydrogen halide to form a substituted butene; and (3) treatment of the substituted butene for removal of a molecule of halogen to form the desired butadiene.

The first step of the method of preparing the ultimate compounds of the invention proceeds most readily when the fluorine-containing halogenated compound contains an iodine atom, but the reaction also proceeds with bromine, and less readily with chlorine. This step may be represented by the reaction:

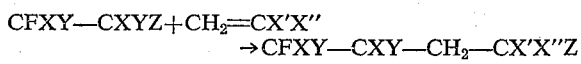

in which X and Y may be fluorine, chlorine, bromine, perfluoroalkyl, cycloalkyl, alkoxy, aryloxy, aryl, and aryl substituted with alkyl, fluorine, chlorine and nitro groups, and at least two of X and Y, which must not be attached to the same carbon atom, must be halogen other than fluorine; Z may be chlorine, bromine or iodine, and must have an atomic weight equal to or greater than that of any other reactive halogen atom present; and X' and X" may be hydrogen, fluorine, chlorine, bromine, alkyl or substituted alkyl having not in excess of twenty carbon atoms. Among the substituted alkyl groups contemplated may be those groups substituted with halogen other than iodine, nitro, alkoxy, aryloxy, aryl, carbalkoxy, carboxy, dialkyl amino, amino and cyano groups.

The reaction in step (1) proceeds via a free radical formation and therefore may be initiated by any reagent which will provide free radicals, such as heat, light, decomposing peroxides, or similar reagents.

The second step of the method of preparing the ultimate compounds of the invention consists of treating the product of step (1) in a manner such that a molecule of hydrogen halide is removed therefrom to form a substituted olefin, having the formula

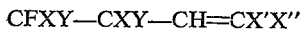

in which X, X', X" and Y are as given above. Removal of a molecule of hydrogen iodide is the preferred procedure because of the reduction of the iodine atom by reagents capable of removing halogen.

The third step in the method of preparing the compounds of the invention consists of treating the product from the second step described above in such manner as to remove a molecule of halogen, thereby forming an ethylenic linkage and producing a diene having the formula

in which X, X', X" and Y are as given above.

The order of steps (2) and (3) above may be reversed, if desired, but in the case where Z in the formula above is iodine, dehydroiodination must be completed before dehalogenation is attempted.

Dehydrohalogenation may be effected by any of the conventional means known to the art, i.e., treatment with alcoholic potassium or sodium hydroxide solution, treatment with aqueous calcium hydroxide suspension, thermal cracking, or treatment with organic bases or ferric chloride.

Similarly, any conventional method may be employed for dehalogenation and may include heating with metallic iron or zinc, sodium amalgam, or other procedures known to the art.

The invention will be further illustrated by reference to the following specific examples:

Example 1

A mixture of 38 grams of allyl chloride, 280 grams of 1,2-dichloro-1,1,2-trifluoro-2-iodoethane and 0.5 gram of benzoyl peroxide was heated at reflux temperture on a steam bath for 2 hours, at the end of which time an additional 0.5 gram of benzoyl peroxide was added, and heating was continued for an additional 2 hours. The cooled reaction mixture was washed, dried and distilled to recover 132 grams of unreacted 1,2-dichloro-1,1,2-trifluoro-2-iodoethane and 147 grams of crude 1,2,5-trichloro-1,1,2-trifluoro-4-iodo-n-pentane, boiling in the temperature range of 113 to 135° C. at a pressure of 20 to 23 mm. This higher boiling fraction was washed, dried and redistilled to yield 110 grams of refined 1,2,5-trichloro-1,1,2-trifluoro-4-iodo-n-pentane, boiling in the temperature range of 106 to 123° C. at a pressure of 18 to 20 mm. Hg absolute, $n_D^{28}$ 1.4980, and having a freezing point below $-65°$ C.

Example 2

A 300 ml. autoclave was charged with 106 grams of 1,2-dichloro-1,1,2-trifluoro-2-iodoethane, 50 ml. of water and 0.5 gram of benzoyl peroxide and was then sealed, evacuated, flushed with propene, and pressured to 50 p.s.i.g. with propene. The autoclave was then heated, while rocking, at a temperature of 200° C. for a period of 45 minutes, while the propene pressure was maintained at about 100 p.s.i.g. Distillation of the washed and dried product yielded 38 grams of 1,2-dichloro-1,1,2-trifluoro-2-iodoethane and 65 grams of a material boiling at 73 to 74° C. at a pressure of 17 mm. Hg absolute, $n_D^{27}$ 1.4710. An analysis of this material indicated it to be 1,2-dichloro-1,1,2-trifluoro-4-iodo-n-pentane.

Example 3

3½ inch diameter glass tube, 13 inches long, was equipped with a 15 watt germicidal fluorescent lamp and a sidearm. Into the tube was placed 150 grams of 1,2-dichloro - 1,1,2 - trifluoro - 2 - iodoethane. The tube was evacuated and flushed with ethylene gas, then pressured to 5 p.s.i.g. with ethylene. The light was turned on and the tube was shaken for 12 hours. Additional ethylene was added to maintain the pressure between 5 and 6 p.s.i.g. At the end of the reaction time, the mixture was distilled at reduced pressure to give recovered 1,2-dichloro-1,1,2-trifluoro-2-iodoethane, 121 grams, and 12 grams of a material boiling at 67 to 67.5° C. at a pressure of 10 mm. Hg absolute, $n_D^{28}$ 1.4710. An analysis of this material indicated it to be 1,2-dichloro-1,1,2-trifluoro-4-iodobutane.

Example 4

Into a 1 liter autoclave were placed 100 grams of 1,2-dichloro-1,1,2-trifluoro-2-iodoethane and 1 gram of benzoyl peroxide. The autoclave was sealed, evacuated, flushed with ethylene, pressured to 25 p.s.i.g. with ethylene, and heated to 60° C., initiating the reaction. The temperature was raised to 100° C. and the ethylene pressure was gradually increased to 50 p.s.i.g. and maintained for 2 hours, at the end of which time the vessel was cooled and bled. Distillation of the product gave an 85 percent yield of 1,2-dichloro-1,1,2-trifluoro-4-iodobutane.

*Example 5*

A solution of 1.5 moles of 85 percent KOH in 750 ml. of absolute alcohol was added to 475 grams of 1,2-dichloro-1,1,2-trifluoro-4-iodobutane in 150 ml. of ethanol, while maintaining the temperature of the mixture at 10° C. in an ice bath. The addition took 1 hour, and the mixture was stirred an additional 2½ hours, at the end of which time the solution was diluted to 2 liters with water, and the resulting lower layer was separated, dried over anhydrous sodium carbonate and distilled to yield 170 grams of 1,2-dichloro-1,1,2-trifluorobutene-3, boiling point: 75 to 77° C., $n_D^{26}$ 1.3740. Analysis showed 26.1 percent carbon, 1.7 percent hydrogen. $C_4H_3F_3Cl_2$ requires 26.8 percent carbon, 1.7 percent hydrogen.

*Example 6*

50 ml. (68 grams) of 1,2-dichloro-1,1,2-trifluorobutene-3 were added over a period of 30 minutes to a refluxing mixture of 100 grams of 30 mesh zinc metal, 5 ml. of concentrated HCl, and 200 ml. of absolute ethanol. The solution was refluxed an additional hour, while the effluent gas was condensed in a trap at a temperature of −78° C. There were obtained, after purification, 17 grams of 1,1,2-trifluorobutadiene-1,3, boiling at a temperature of about 18° C. This product is particularly useful as a monomer in the preparation of homopolymers and also copolymers with other polymerizable materials. These polymers can be obtained as plastic solids which are of potential importance in view of their chemical inertness.

The compounds 1,2,5-trichloro-1,1,2-trifluoro-4-iodo-n-pentane and 1,2-dichloro-1,1,2-trifluoro-4-iodo-n-pentane have utility as precursors for the preparation of a homologue of 1,1,2-trifluorobutadiene-1,3, following the procedures outlined in Examples 5 and 6; the resulting diene is also a useful monomer in the preparation of chemically inert polymers.

It will be obvious to those skilled in the art that many modifications may be made within the scope of the present invention without departing from the spirit thereof and the invention includes all such modifications.

I claim:

1. A method which comprises reacting 1,2-dichloro-1,1,2-trifluoro-2-iodoethane with ethylene gas to form 1,2-dichloro-1,1,2-trifluoro-4-iodobutane, subjecting the latter compound to dehydroiodination to form 1,2-dichloro-1,1,2-trifluorobutene-3, and subjecting the latter compound to dechlorination to form 1,1,2-trifluorobutadiene-1,3.

2. A method for the preparation of a fluorine-substituted diene which comprises coupling a 1,1,2-trifluoroethane having three additional halogen substituents other than fluorine, one of these halogen atoms in the 2-position having an atomic weight at least equal to any of the other reactive halogen atoms present, with a compound represented by the formula

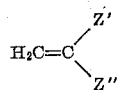

wherein Z′ is selected from the group consisting of hydrogen, fluorine and methyl and Z″ is selected from the group consisting of hydrogen and fluorine, with the proviso that when Z′ is methyl, Z″ is hydrogen; and treating the resulting product to effect the removal of one molecule of hydrogen halide and one molecule of halogen without removing the fluorine atoms.

3. The method according to claim 2 which comprises coupling 1,2-dichloro-1,1,2-trifluoro-2-iodoethane with propene.

References Cited by the Examiner

UNITED STATES PATENTS

| | | | |
|---|---|---|---|
| 2,628,987 | 2/1953 | Ruh et al. | 260—653 |
| 2,635,121 | 4/1953 | Smith et al. | 260—653 |
| 2,664,449 | 12/1953 | Miller | 260—653 |
| 2,674,631 | 4/1954 | Miller et al. | 260—653 |
| 2,681,942 | 6/1954 | Ruh et al. | 260—653 |
| 2,686,207 | 8/1954 | Crane et al. | 260—653 |
| 2,750,431 | 6/1956 | Tarrant et al. | 260—653.3 |

FOREIGN PATENTS

| | | |
|---|---|---|
| 474,945 | 7/1951 | Canada. |
| 737,276 | 7/1943 | Germany. |

OTHER REFERENCES

McBee et al.: J.A.C.S. 74, pp. 1387 to 1390 (1953).

Rausch: Preparation & Properties of Perfluoroacrylonitrile and Its Derivatives, University of Colorado, Ph. D. Thesis, p. 24, Oct. 28, 1953.

Tarrant et al.: J.A.C.S., 76, pp. 3466–3467 (1954).

LEON ZITVER, *Primary Examiner.*

EARL M. HUTCHISON, *Examiner.*

A. D. SULLIVAN, D. D. HORWITZ,
*Assistant Examiners.*